United States Patent [19]
Hara

[11] Patent Number: 4,970,370
[45] Date of Patent: Nov. 13, 1990

[54] TRACK CONTROL METHOD FOR A ROBOT
[75] Inventor: Ryuichi Hara, Yamanashi, Japan
[73] Assignee: Fanuc Ltd, Minamitsuru, Japan
[21] Appl. No.: 315,684
[22] PCT Filed: Aug. 4, 1988
[86] PCT No.: PCT/JP88/00777
  § 371 Date: Feb. 14, 1989
  § 102(e) Date: Feb. 14, 1989
[87] PCT Pub. No.: WO89/01199
  PCT Pub. Date: Feb. 9, 1989
[30] Foreign Application Priority Data
  Aug. 4, 1987 [JP] Japan ................................ 62-193705
[51] Int. Cl.$^5$ ............................................... B23K 9/27
[52] U.S. Cl. ............................... 219/124.34; 219/425.1; 901/42
[58] Field of Search ......................... 219/125.1, 124.34; 901/42, 3, 4, 5; 318/569, 574, 575

[56] References Cited
U.S. PATENT DOCUMENTS
4,014,495  3/1977  Oda et al. ........................ 219/125.1
4,233,491 11/1980  Maruyama et al. ............... 219/125.1
4,853,603  8/1989  Onoue et al. ........................ 318/569

Primary Examiner—Clifford C. Shaw
Attorney, Agent, or Firm—Staas & Halsey

[57] ABSTRACT

There is provided a track control method for a robot, in which a welding operation can be executed by moving a workpiece along a predetermined track, with respect to a fixed welding torch. The welding torch (1) is disposed fixedly, while the workpiece (W) is held by means of a robot hand. Before starting the welding operation, the workpiece is located at each target point (a1, a2), and a workpiece coordinate position (T1, T2) corresponding to a hand operating position, at each target point, is taught. During the welding operation, a playback function of the robot is utilized for driving various robot operating sections, including robot arms and a robot hand, so that positions to which the workpiece is moved are coincident with a series of calculated workpiece coordinate positions. Thereupon, the welding is performed along the predetermined track on the workpiece as the workpiece moves, despite the change of the position of the workpiece relative to the distal end of an arm (4).

3 Claims, 1 Drawing Sheet

TRACK CONTROL METHOD FOR A ROBOT

BACKGROUND OF THE INVENTION

1. Field of the Invention

The present invention relates to a track control method for a robot, and more particularly, to a track control method for a robot, in which a workpiece can be moved along a predetermined track with respect to a fixed point of operation so that a required operation can be accomplished.

2. Description of the Related Art

Conventionally, in an articulated playback robot, for example, and end effector, e.g., a welding torch, which is mounted on an end effector mounting portion at the distal end of a series of arms supported by means of the body of the robot, is moved for a welding operation along a predetermined track with respect to a workpiece kept at a standstill. FIG. 2 is a schematic view of the robot of this type, in which reference symbols X, Y and Z represent a three-dimensional rectangular reference coordinate system (body coordinate system) whose origin lies on one point O on the robot body. In this reference coordinate system, the workpiece is kept in a stationary state. Symbol U designates the coordinate position, in the reference coordinate system, of the origin of a workpiece coordinate system set for the workpiece.

Prior to the execution of actual operation by means of the robot, the robot is previously instructed of, for example, two target points on the track of the end effector. Symbols P1 and P2 indicate the coordinate positions of first and second target points, respectively, in the workpiece coordinate system.

First, an operator operates the various arms so that the operating position (point of operation) of the end effector, e.g., the position of the tip end of the welding torch, is coincident with the first target point P1. By this operation, the end effector mounting portion at the distal end of the arms is caused to take a coordinate position R1 in the reference coordinate system. Then, the operator instructs the robot of the target point P1. In response to this teaching operation, the operating states (operating positions of individual axes) of various robot operating sections, including joints between the arms of the robot, at the target point P1, are detected by means of various sensors attached to the robot, and these detected operating states are stored as control information.

Subsequently, the arms are operated so that the point of operation of the end effector is coincident with the second target point P2, with a coordinate position T of the point of operation of the end effector, in an end effector coordinate system (mechanical interface coordinate system) set for the end effector mounting portion, kept fixed. As a result, the end effector mounting portion takes a coordinate position R2 in the reference coordinate system. At the target point P2, the same teaching operation as aforesaid is performed, and the operating positions of the individual axes at this point of time are stored.

In the actual operation, the robot performs the required operation in a manner such that the point of operation is moved along the predetermined track.

Here let us consider the coordinate position of the point of operation in the reference coordinate system. In general, the sensors serve to detect the operating states of their associated robot operating sections, in a coordinate system set for the operating sections. In order to obtain the coordinate position of the end effector mounting portion in the reference coordinate system in response to these detected states, therefore, a series of coordinate system transformations are performed with respect to the detected parameter values. The coordinate position of the end effector mounting portion after this series of coordinate system transformations will hereinafter be designated by [R]. In order to obtain the coordinate position of the point of operation of the end effector in the reference coordinate system, moreover, coordinate system transformation for the end effector, from the end effector coordinate system to the reference coordinate system, that is, coordinate system transformation corresponding to the posture of the end effector relative to the end effector mounting portion, is performed. A coordinate system transformation matrix for this transformation will hereinafter be designated by [T].

Since values in the workpiece coordinate system are given individually to the target points P1 and P2, on the other hand, coordinate system transformation is performed to represent these target points in terms of the reference coordinate system. Hereinafter, the coordinate position of the target point in the workpiece coordinate system will be designated by [P], and a coordinate system transformation matrix for transformation from the workpiece coordinate system to the reference coordinate system will be designated by [U].

Since the point of operation and the target point are coincident with each other, the following equation holds:

$$[R][T] = [U][P]. \quad (1)$$

From equation (1), we obtain $$[P] = [U]^{-1}[R][T]. \quad (2)$$

In the conventional robot, as described above, the position of the point of operation of the end effector relative to the end effector mounting portion is fixed, and the workpiece is fixed, so that the coordinate system transformation matrices [T] and [U] are constant. Thus, if the coordinate positions [R] of the end effector mounting portion corresponding to the coordinate positions [P] (P1 and P2) of the first and second target points, given for instruction in the aforesaid manner, are obtained, and if the coordinate position of each interpolating point between the two target points is [P], the coordinate position [R] at each interpolating point is given by $$[R] = [U][P][T]^{-1}. \quad (3)$$

At the time of playback operation, the track of the point of operation is controlled in accordance with the series of coordinate positions of the end effector mounting portion or the distal end of the arms in the reference coordinate system, obtained in the aforesaid manner.

According to the conventional method, however, it is impossible to perform an operation such that the positional relationship between the distal end of the arms and the point of operation of the end effector, that is, the transformation matrix [T], changes with the passage of time. It is impossible, for example, to perform a welding operation in which the workpiece is moved relatively to a fixed welding torch, for welding.

SUMMARY OF THE INVENTION

The object of the present invention is to provide a track control method for a robot, in which a workpiece can be moved along a predetermined track with respect to a fixed point of operation so that a required operation can be accomplished.

In order to achieve the above object, a track control method for a robot according to the present invention comprises steps of: (a) fixing a point of operation in a reference coordinate system; (b) positioning the workpiece so that each target point on a predetermined workpiece track is coincident with the point of operation; (c) teaching an operating position of an end effector, relative to an end effector mounting portion, each time the positioning is finished; and (e) driving the robot in accordance with the thus taught respective end effector operating positions.

Thus, according to the present invention, the robot is driven in accordance with the end effector operating position given for instruction at a plurality of target points on the predetermined workpiece track, so that the workpiece can be moved along the predetermined track to accomplish a required operation, even in an operation of a type such that the workpiece is moved with respect to a fixed point of operation, which involves change of the end effector operating position.

DESCRIPTION OF THE PREFERRED EMBODIMENT

Figure 1:
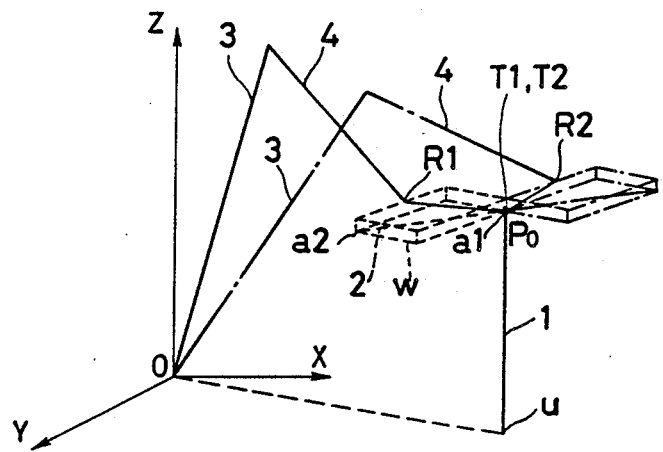
FIG. 1 is a schematic view showing a robot to which is applied a track control method for a robot according to an embodiment of the present invention.
Figure 2:
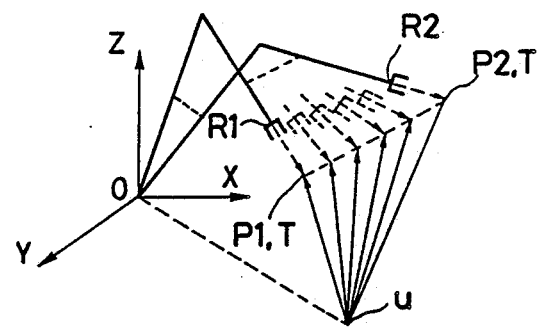
FIG. 2 is a schematic view showing a prior art track control method for a robot.

In an X-Y-Z three-dimensional rectangular reference coordinate system whose origin lies on one point O on the body of an articulated playback robot, as shown in FIG. 1, a welding torch 1 is disposed in a stationary state, and extends along the Z-axis of the reference coordinate system. Reference symbol U designates a coordinate system, set for the welding torch 1, in the reference coordinate system, and symbol Po designates the coordinate position of the tip end of the welding torch 1, i.e., the point of operation, in the welding torch coordinate system.

The robot (part of which is omitted from the illustration) comprises a series of arms (only arms 3 and 4 are shown for simplicity of illustration) coupled to the robot body, and a hand, as an end effector, attached to an end effector mounting portion which is provided at the distal end of the series of arms. The robot body and the arm on the robot body side, as well as the adjacent arms, are coupled by means of joints. The robot is adapted to move a planar workpiece W, which is held by means of the hand, from the position indicated by broken line in FIG. 1 to the position indicated by dashed line, that is, along a predetermined track 2 which connects a first vertex a1 and a second vertex a2 of the workpiece W, with respect to the welding torch 1. Preferably, the workpiece movement is effected so that the workpiece W is kept in a posture such that the bottom surface of the workpiece is parallel to the X-Y plane. The hand is provided with a hand coordinate system for representing the operating position of the hand relative to the end effector mounting portion.

The robot comprises drive means (not shown) for driving various robot operating sections, including the arms 3 and 4, various joints, and the hand, various sensors (not shown) for detecting the operating states of the individual operating sections, and control means (not shown) including means for storing detection results from the sensors and adapted to control the drive means. A description of these elements is omitted herein, since they can be constructed by conventional methods.

The following is a description of the operation of the robot constructed in this manner. Prior to the execution of actual operation by means of the robot, the robot is instructed. First, the workpiece W is located at a welding start point, that is, a position such that the first vertex a1 of the workpiece W is coincident with the tip end (point of operation) of the welding torch 1, on the bottom side of the workpiece W. At this time, the distal end of the arm 4 takes a coordinate position R1 in the reference coordinate system. The coordinate position of that region of the workpiece W which faces the tip end (point of operation) of the welding torch, in the hand coordinate system, corresponding to the operating position of the hand in the hand coordinate system, is designated by T1. Then, the teaching is performed in this state. In response to this teaching operation, the operating states of the various robot operating sections, including the coordinate position T1 of the workpiece, at the time of the aforesaid positioning, are detected by means of the various sensors attached to the robot, and these detected operating states are stored as control information.

Subsequently, the workpiece W is located at a welding end point. At this time, the second vertex a2 of the workpiece W is coincident with the tip end of the welding torch 1, and the distal end of the arm 4 takes a coordinate position R2 in the reference coordinate system. The coordinate position of that region of the workpiece W which faces the point of operation, corresponding to the operating position of the hand, is designated by T2. Then, the teaching is performed in this state, and the operating states of the various robot operating sections, including the workpiece coordinate position T2 different from the workpiece coordinate position T1, are detected and stored.

When the aforesaid teaching operation ends, the actual operation is performed utilizing a playback function of the robot.

Transforming equation (1), we now obtain $$[T] = [R]^{-1}[U][P]. \tag{4}$$

In the present embodiment, as mentioned before, the welding torch 1 is fixed, so that a coordinate system transformation matrix [U] for the transformation from the torch coordinate system to the reference coordinate system and the coordinate position [P] of the point of operation or the tip end of the welding torch 1, in the torch coordinate system, are constant and known. Moreover, the workpiece coordinate positions [T] at the welding start point and the welding end point are known through the teaching operation. Thereupon, a required number of interpolating points are set between both workpiece coordinate positions at the welding start point and the welding end point, and interpolation is then executed to determine the operating states of the various robot operating sections at the individual interpolating points. For example, the workpiece coordinate position [T] at each interpolating point is calculated, and the coordinate position [R] of the end effector mounting portion or the distal end of the arm 4 at each interpolating point, in the reference coordinate system, is calculated according to equation (4).

Then, the control means of the robot causes the drive means to control the position, posture, and speed of the workpiece W, as well as the positions, postures, and speeds of the various robot operating sections, including the arms 3 and 4 and the hand, so that the distal end of the arm 4 is coincident with the coordinate position [R] calculated as aforesaid, and that the workpiece coordinate position corresponds to the calculated position [T], that is, the predetermined track 2 on the workpiece W and the tip end of the welding torch 1 are coincident, throughout the range from the welding start point to the welding end point.

What is claimed is:

1. A track control method for a robot for manipulating a workpiece, comprising steps of:
   (a) fixing a point of operation in a reference coordinate system;
   (b) positioning the workpiece so that each target point on a predetermined workpiece track is coincident with the point of operation;
   (c) teaching an operating position of an end effector, relative to an end effector mounting portion, each time said positioning step (b) is completed; and
   (d) driving the robot in accordance with the thus taught respective end effector operating positions.

2. A track control method for a robot having a hand for manipulating a workpiece with respect to a fixed operating position, comprising the steps of:
   (a) positioning the workpiece so that a target point on a predetermined workpiece track is coincident with the fixed operating position;
   (b) teaching a hand position of the hand holding the workpiece after said positioning step (b) is completed;
   (c) repeating said steps (a) and (b) until the workpiece has been positioned at each target point on the predetermined workpiece path; and
   (d) operating the robot in accordance with the taught hand positions.

3. A track control method as set forth in claim 2, wherein said step (d) comprises performing a welding operation while the robot hand moves the workpiece along the predetermined workpiece track.

* * * * *